US005771015A

United States Patent [19]

Kirtman et al.

[11] Patent Number: 5,771,015

[45] Date of Patent: Jun. 23, 1998

[54] CONTROLLABLE ANTENNA SYSTEM

[76] Inventors: Stuart E. Kirtman; David A. Kirtman, both of 14 Poets La., Metuchen, N.J. 08840

[21] Appl. No.: 560,860

[22] Filed: Nov. 20, 1995

[51] Int. Cl.[6] .......... H04B 7/185; G01S 5/02

[52] U.S. Cl. .......... 342/359

[58] Field of Search .......... 342/359; 343/766, 343/758, 882, 883, 725, 728

[56] References Cited

U.S. PATENT DOCUMENTS

| | | | |
|---|---|---|---|
| 2,847,627 | 8/1958 | Lieberman | 318/74 |
| 3,041,609 | 6/1962 | Rathenau | 343/766 |
| 3,478,361 | 11/1969 | Middlemark | 343/730 |
| 3,508,274 | 4/1970 | Kesler et al. | 343/758 |
| 3,886,559 | 5/1975 | Lanson et al. | 343/726 |
| 4,062,156 | 12/1977 | Roth . | |
| 4,352,202 | 9/1982 | Carney . | |
| 4,796,032 | 1/1989 | Sakurai et al. | 342/359 |
| 4,804,899 | 2/1989 | Wurdack et al. | 318/600 |
| 4,862,179 | 8/1989 | Yamada | 342/359 |
| 5,214,364 | 5/1993 | Perdue et al. | 318/600 |
| 5,471,219 | 11/1995 | Rodeffer et al. | 342/359 |
| 5,678,171 | 10/1997 | Toyama et al. | 342/359 |

*Primary Examiner*—Theodore M. Blum
*Attorney, Agent, or Firm*—Irwin Ostroff; Erwin Pfeifle

[57] ABSTRACT

A system for the control of the orientation and configuration of an indoor TV antenna. Such control can be effected by using an infrared remote control device, such as the type conventionally used as a TV remote control, which controls the antenna directly. Alternatively, optimum antenna orientation and configuration can be determined for each channel and stored in a memory and, when the viewer selects a particular channel, the antenna is automatically adjusted to the stored optimum orientation and configuration associated with that channel. Some of the antenna characteristics which can be controlled and stored include the orientation of antenna elements about a vertical axis, the length of the elements, the relative angle between elements, the angular orientation of a loop antenna about a vertical axis, the angular orientation of a loop antenna about a horizontal axis, the diameter of the loop antenna, and other attributes such as antenna amplifier gain.

60 Claims, 5 Drawing Sheets

| MEMORY LOCATION NUMBER | L1 | θ1 | φ1 | L2 | θ2 | φ2 | α | β | δ | ROD SWITCH | A/B/C SWITCH | AMPLIFIER GAIN | CHANNEL | TIME |
|---|---|---|---|---|---|---|---|---|---|---|---|---|---|---|
| 1 | | | | | | | | | | | | | | |
| 2 | | | | | | | | | | | | | | |
| 3 | | | | | | | | | | | | | | |
| 4 | | | | | | | | | | | | | | |
| 5 | | | | | | | | | | | | | | |
| 6 | | | | | | | | | | | | | | |
| 7 | | | | | | | | | | | | | | |
| 8 | | | | | | | | | | | | | | |
| 9 | | | | | | | | | | | | | | |

34

FIG. 2

CONTROLLABLE ANTENNA SYSTEM

BACKGROUND OF THE INVENTION

This invention relates to antenna systems and, more particularly, to a system for controlling the configuration of an antenna from a remote location. Specifically, the present invention finds particular utility in conjunction with an indoor television antenna.

Although many homes today are wired for cable television reception, a large number of homes still utilize an indoor TV antenna. Typically, such an antenna includes a pair of telescoping receiving rods, or "rabbit ears", for VHF reception and a loop for UHF reception. To obtain optimal reception from an indoor antenna, the antenna must be reconfigured on a channel-by-channel basis. Such reconfiguring may involve altering the antenna's physical shape, size, orientation, and/or its electrical parameters. This results in the need for continued manual adjustment by the viewer, which is a time consuming process. Such manual adjustment is also disadvantageous in that having the viewer approach the antenna negates the benefits associated with having a remote controlled television. Further, as the viewer adjusts the antenna he becomes, by virtue of his proximity to it, part of the antenna system and therefore affects antenna performance. When the viewer then moves away from the antenna and returns to his normal viewing location, performance is again affected. Adjusting the antenna for optimal reception thus becomes an iterative process that may be particularly frustrating to the viewer.

It is therefore an object of the present invention to provide a system by means of which a viewer can optimally configure an indoor antenna by remote control.

It is another object of this invention to provide such a system which stores a set of configuration parameters for each of the television's viewing channels which the viewer perceives to be optimal for that channel, and thereafter can utilize the stored sets of configuration parameters to configure the antenna in accordance with the channel to which the television is tuned.

SUMMARY OF THE INVENTION

The foregoing and additional objects are attained in accordance with the principles of this invention by providing a system for configuring an antenna having at least one receiving element mounted to a base, the receiving element being movable relative to the base. The system comprises controllable electro-mechanical means coupled between the base and the receiving element for selectively moving the element relative to the base, control unit means responsive to operator manipulation thereof for selectively transmitting a control signal, receiver means for receiving the control signal, and control means coupled to the receiver means and to the electro-mechanical means for responding to a received control signal and controlling the electro-mechanical means in accordance with the received control signal to move the receiving element so as to effect a desired configuration of the antenna. The antenna is associated with a receiver tunable to a selected one of a plurality of frequencies and the control means includes addressable memory means for storing a plurality of sets of configuration parameters. Each of the sets of configuration parameters is stored in a respective addressable location of the memory means and each memory means address corresponds to a respective frequency. The control unit means is effective for transmitting a control signal which corresponds to a designated frequency and the control means is responsive to a received control signal corresponding to the designated frequency for retrieving from the memory means the set of configuration parameters stored at the memory means address corresponding to the designated frequency and controlling the electro-mechanical means to move the receiving element so as to configure the antenna in accordance with the retrieved set of configuration parameters.

In accordance with an aspect of this invention, the electro-mechanical means includes controllable motor means coupled to selectively rotate the receiving element about an axis and the control means responds to a received control signal to cause the motor means to rotate the receiving element to a desired angular orientation about the axis.

In accordance with another aspect of this invention, the receiving element is a receiving rod having a plurality of telescoping rod sections, the electro-mechanical means includes controllable motor means coupled to at least one of the rod sections for selectively moving that rod section in telescoping relation to another of the plurality of rod sections so as to vary the overall length of the receiving rod and the control means responds to a received control signal to cause the motor means to achieve a desired overall length for the receiving rod.

In accordance with a further aspect of this invention, the receiving element is a receiving loop of generally circular shape, the loop including a section of controllably variable effective length, the electro-mechanical means includes controllable motor means coupled to vary the length of the loop section and the control means responds to a received control signal to cause the motor means to vary the length of the loop section so as to achieve a desired effective diameter for the receiving loop.

BRIEF DESCRIPTION OF THE DRAWINGS

The foregoing will be more readily apparent upon reading the following description in conjunction with the drawings in which like elements in different figures thereof are identified by the same reference numeral and wherein:

FIG. 2 shows an illustrative memory layout;

DETAILED DESCRIPTION

While the following discussion refers to a television set and an antenna associated therewith, it is understood that the present invention can be utilized with an antenna for other receivers, such as a VCR or a stereo receiver in the home, or a stereo receiver in an automobile. Accordingly, any reference in the following discussion to a television set and TV channels is illustrative only, since the present invention can be utilized with other types of signal receivers tunable to selected ones of a plurality of frequencies.

Figure 1:
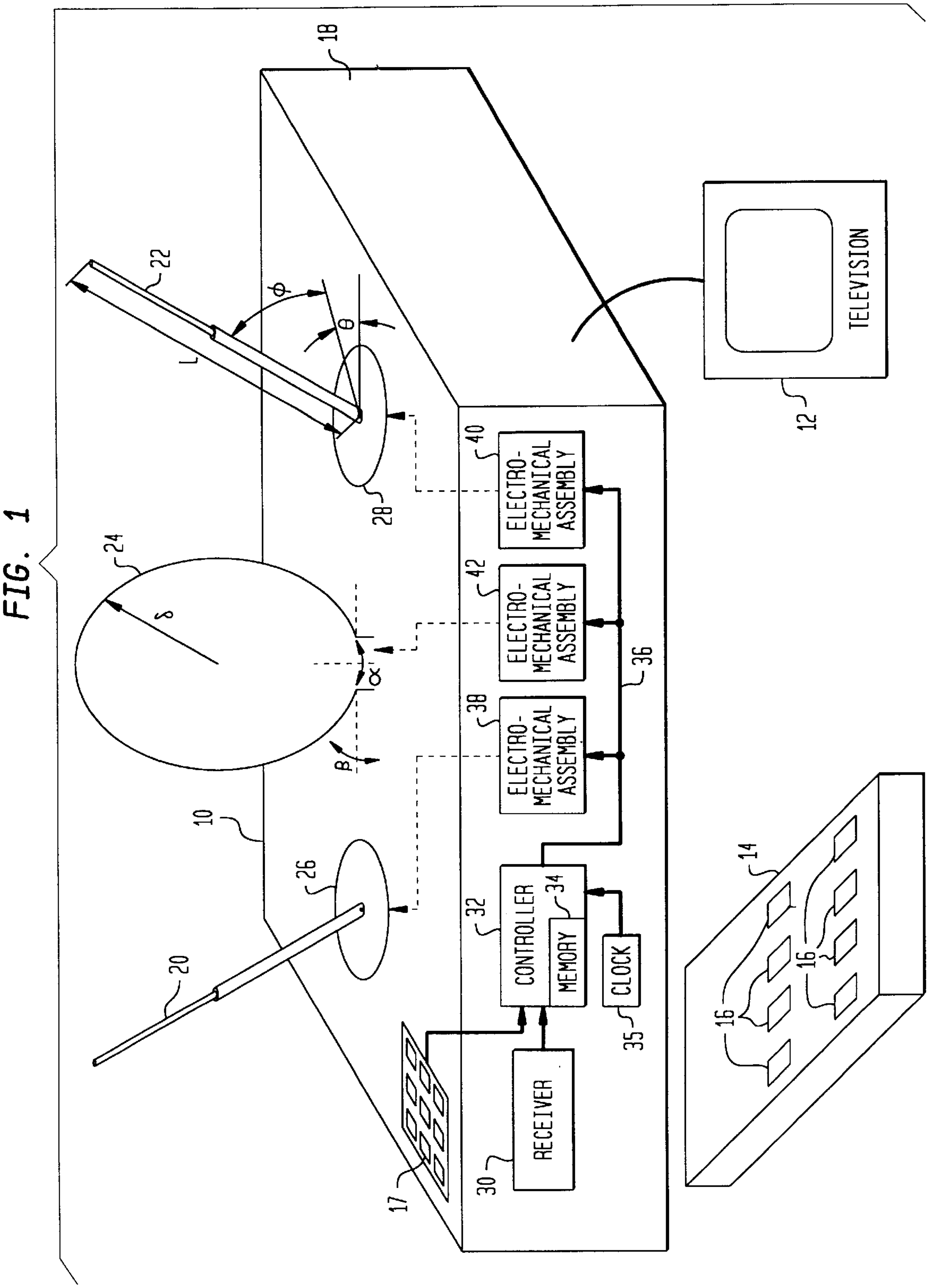
FIG. 1 is a schematic diagram showing an illustrative antenna system constructed in accordance with the principles of this invention.

Referring now to the drawings, FIG. 1 schematically shows an antenna system, designated generally by the reference numeral 10, which is constructed in accordance with the principles of this invention and is coupled to a television receiver 12. The antenna system 10 is controllable either from a remote location by a remote control unit 14 which includes a plurality of operator manipulatable switch actuators 16 accessible on a surface thereof or from a keypad 17 mounted to the base 18.

The antenna system 10 includes a base, or housing, 18 onto or into which elements of the system are mounted. Illustratively, the antenna system 10 is an indoor television antenna which includes first and second telescopic receiving rods (rabbit ears) 20, 22 for VHF reception and a generally circular receiving loop 24 for UHF reception. Illustratively, each of the rods 20, 22 is mounted to the base 18 on a respective turntable 26, 28 so that it is rotatable about a vertical axis to an angle $\theta$. In addition, each of the rods 20, 22 is rotatable about a horizontal axis to an angle $\phi$, as well as being telescopically movable to achieve an overall length L. Similarly, the receiving loop 24 is rotatable about a vertical axis to an angle $\alpha$ and is rotatable about a horizontal axis to an angle $\beta$. Further, the radius $\delta$ of the loop 24 is controllable. The mechanisms for effecting the afore-described changes in the configurations of the receiving elements 20, 22, 24 will be described in full detail hereinafter.

As shown, the remote control unit 14 transmits control signals, illustratively by infrared waves, as is well known in the art. These infrared rays are received by the receiver 30, which converts them into electrical signals and passes them on to the controller 32. Alternatively, the keypad 17 is coupled directly to the controller 32. The controller 32 is illustratively a programmed microprocessor which includes a memory 34. The controller 32 analyzes the control signals received from the receiver 30 or the keypad 17 and interrogates the memory 34 which has stored therein sets of configuration parameters for the receiving elements 20, 22, 24. The controller 32 then sends out appropriate signals over the bus 36 to control the electro-mechanical assemblies 38, 40, 42 to configure the receiving elements 20, 22, 24, respectively, in accordance with the appropriate set of configuration parameters. Alternatively, an appropriate control signal from the remote control unit 14 or the keypad 17 can cause the controller 32 to set the configuration of the antenna system 10 in a random manner, using a stochastic process, so the viewer can rapidly evaluate a number of configurations from a diverse group of configurations and select that configuration which provides optimal reception. More particularly, in the stochastic process, appropriate control signals from the remote control unit 14 or the keypad 17 can cause the controller 32 to generate, for each of the adjustable antenna elements of the antenna system 10, an appropriate random number that is indicative of a respective angle, length, etc. for that antenna element. Each set of the generated random number configuration parameters is used to control the electro-mechanical assemblies 38, 40, 42 for viewer evaluation. The sets of random (or pseudo-random) number may be generated using any known method in the art, such as, for example, a random number generator that generates random numbers only within the range of the angle, length, etc. for each element of the antenna system 10.

It is known that the perceived optimal configuration of the receiving elements 20, 22, 24 will usually vary from channel to channel. Therefore, the present invention contemplates that the user will control the configuration of the receiving elements 20, 22, 24 through the remote control unit 14 (which illustratively serves as the remote control unit for both the antenna and the TV) or the keypad 17 for each channel so as to attain what is perceived to be the optimum configuration of the elements 20, 22, 24 and then store the set of configuration parameters for that channel in the memory 34. This is done for each of the viewable channels. Subsequently, when the viewer selects a channel via the remote control unit 14, an identification of the selected channel will be transmitted from the remote control unit 14 and the controller 32 will retrieve from the memory 34 the set of configuration parameters for the selected channel. FIG. 2 shows an illustrative layout for the memory 34 wherein each addressable memory location corresponds to a particular channel and contains the set of configuration parameters- for the antenna system 10 which had previously been stored as being the perceived optimal configuration. Thus, as shown in FIG. 2, each addressable memory location stores for the first receiving rod 20 its overall length L1 and the angles $\theta 1$ and $\phi$1; for the second receiving rod 22 its overall length L2 and the angles $\theta 2$ and $\phi$2; and for the receiving loop 24 the angles $\alpha$ and $\beta$ and the radius $\delta$. In addition, memory space is allocated for the state of the rod switch, the state of the A/B/C switch, the amplifier strength, the channel to which that addressable memory location corresponds, and time, as will be described hereinafter. Thus, the term "configuration parameters" refers to both physical and electrical variables for the antenna.

Figure 3:
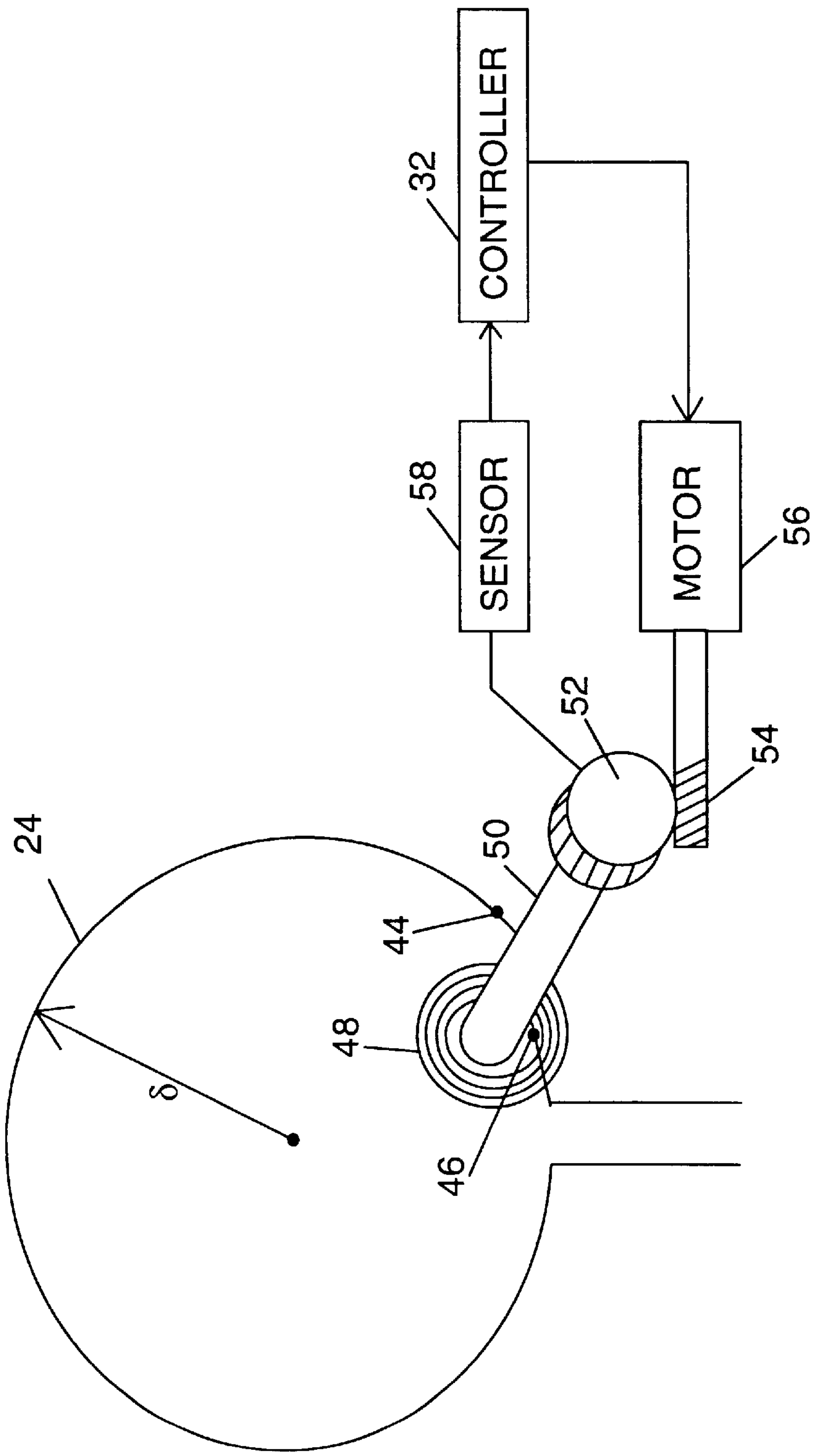
FIG. 3 shows an illustrative arrangement for controlling the diameter of a loop antenna.

FIG. 3 shows an illustrative arrangement for varying the size of the loop 24. The loop 24 is of generally circular shape and has a section 48, between the points 44 and 46, which is of controllably variable effective length. Illustratively, this section 48 is wound on a spool 50 having an axial extension terminated by a gear 52. The gear 52 is meshed with a worm gear 54 on the output shaft of the reversible motor 56. Operation of the motor 56 in a first direction causes the section 48 to be wound on the spool 50 and shorten the effective length of the section 48, thereby decreasing the radius $\delta$ of the loop 24. Operation of the motor 56 in the opposite direction causes the section 48 to be unwound from the spool 50 and increase the effective length of the section 48, thereby increasing the radius $\delta$ of the loop 24. Thus, a change in the effective length of the loop section 48 corresponds to a change in the radius $\delta$. Control of the motor 56 is effected by the controller 32 which has been supplied with the desired radius $\delta$ stored in the memory 34, This desired parameter is compared against the output of the sensor 58 which is coupled to the spool 50/gear 52 so as to provide a signal representative of the effective length of the section 48. The sensor 58 may comprise a potentiometer, shaft encoder, or other suitable sensing element, and is a matter of design choice, as is apparent to one of skill in the art.

Figure 4:
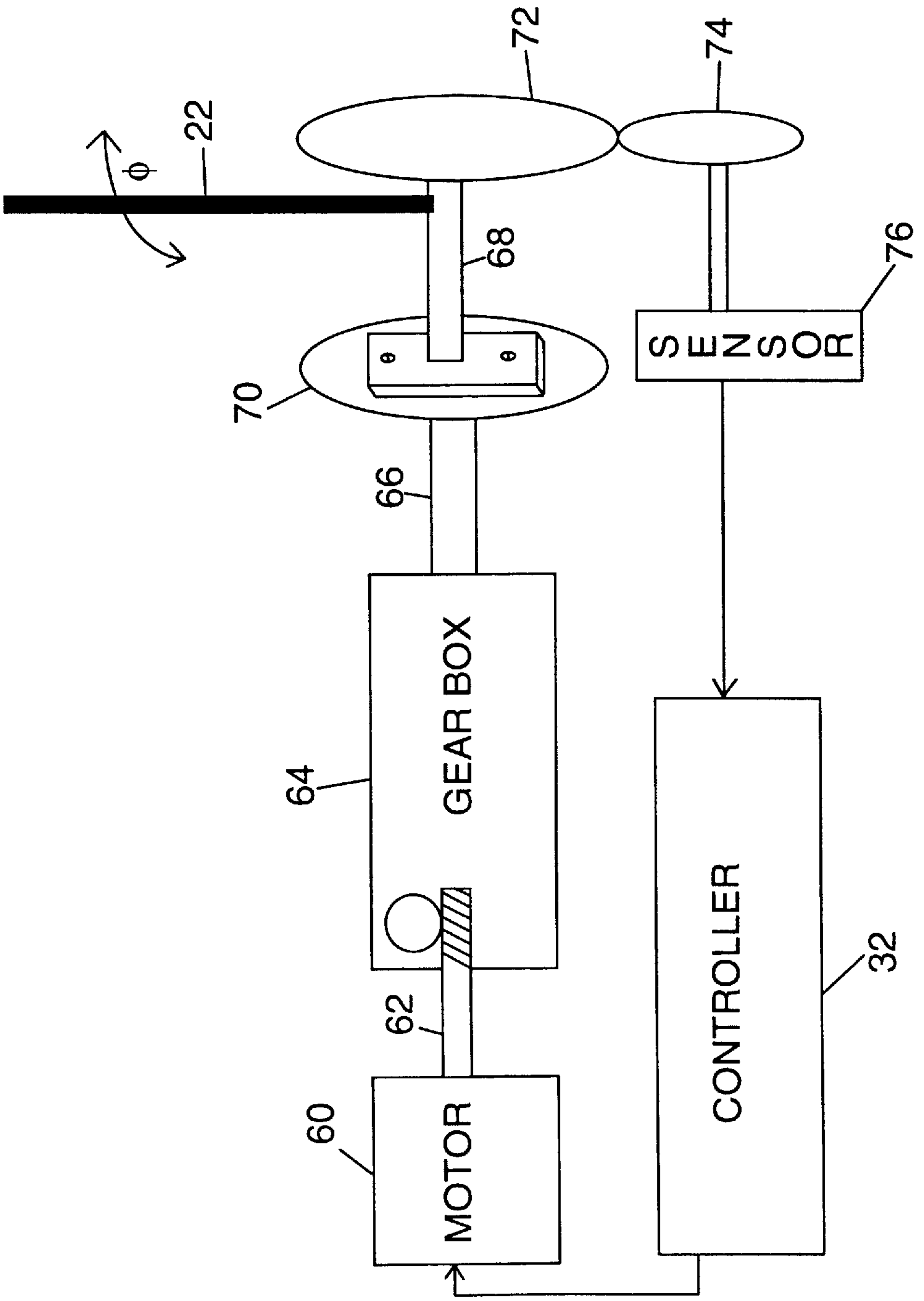
FIG. 4 shows an illustrative arrangement for rotating a receiving element about an axis.

FIG. 4 shows an illustrative arrangement for controlling the angle $\phi$ of the rod 22 about a horizontal axis. As illustrated, the arrangement includes a reversible motor 60, the operation of which is controlled by the controller 32, and whose output shaft 62 is coupled to a gear box 64, which illustratively provides a gear reducing function. The output shaft 66 of the gear box 64 is coupled to the shaft 68 in a colinear manner through the clutch 70. The shaft 68 defines the horizontal axis about which the rod 22, which is connected transversely to the shaft 68, is rotated to the angle $\phi$. The end of the shaft 68 remote from the clutch 70 is coupled through gears 72, 74 to the sensor 76, which may illustratively be a potentiometer, which is in turn coupled to the controller 32. Thus, as with the arrangement shown in FIG. 3, the controller 32 retrieves the desired angle $\phi$ from the memory 34 and operates the motor 60 until the output from the sensor 76 indicates that the rod 22 is at the desired angle $\phi$. The reason for the clutch 70 is to selectively decouple the rod 22 from the motor 60 while leaving the rod 22 still coupled to the sensor 76, so that the viewer can manually adjust the angle $\phi$ for the rod 22 and the sensor 76 will always indicate its actual position. In addition, the clutch 70 will prevent damage in case the rod 22 becomes jammed, for example, by being moved against a wall. Any suitable coupling mechanism, such as, for example, a friction clutch, can be utilized as the clutch 70.

While not specifically illustrated, the angle $\theta$ for the rod 22 can be controlled by an arrangement the same as that shown in FIG. 4. Similarly, the angles $\alpha$ and $\beta$ for the loop 24 can be controlled by arrangements similar to that shown in FIG. 4.

To adjust the overall length L of the rod 22, the inner telescoping sections of the rod 22 are moved by a motor, using a control arrangement similar to that shown in FIG. 4 but with the coupling of the motor to the telescoping sections being similar to that used, for example, with a power automobile antenna.

Figure 5:
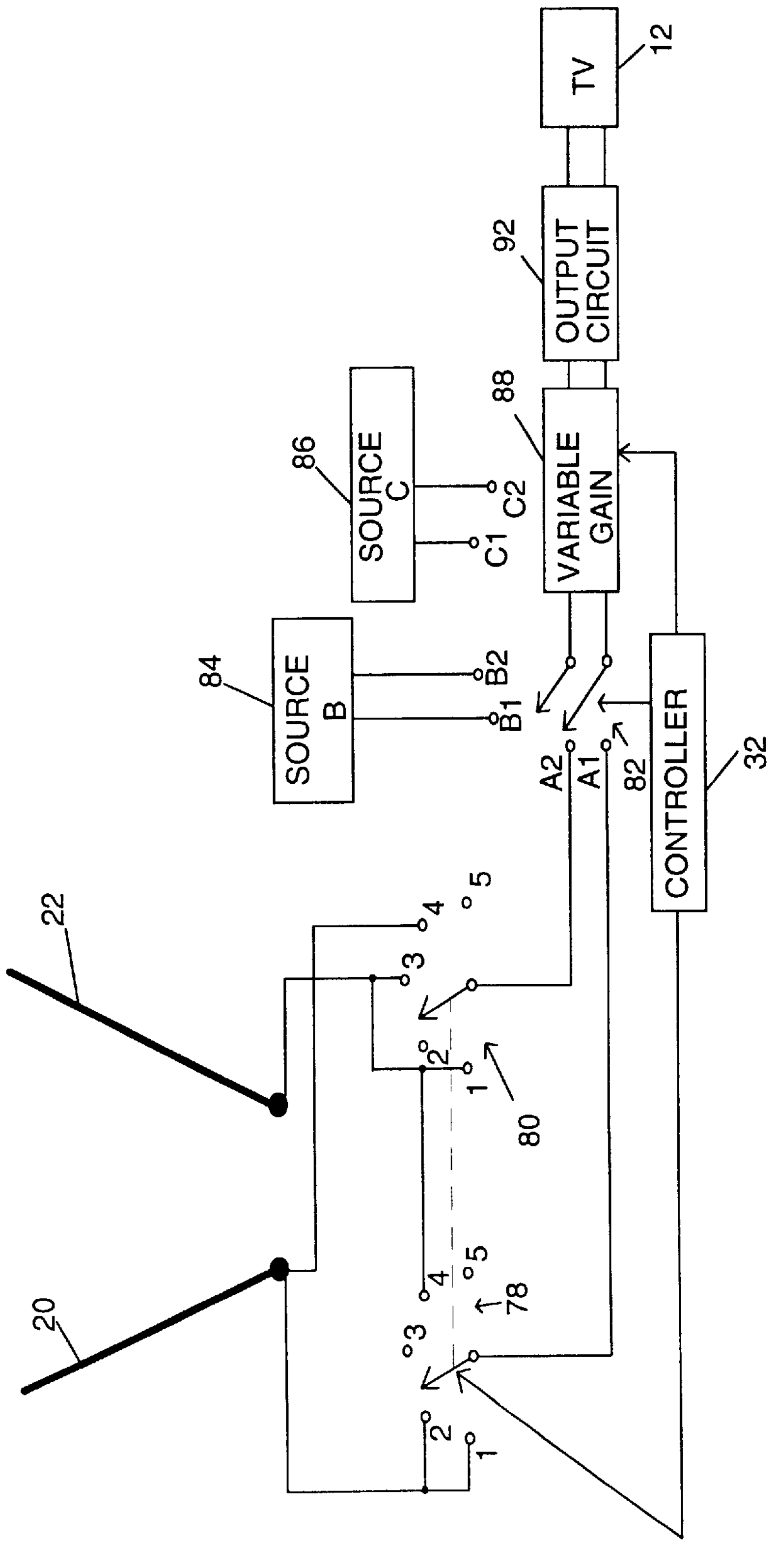
FIG. 5 shows an illustrative arrangement for controlling the switching of a plurality of receiving elements and input sources and varying the gain of the antenna.

It may sometimes be desired to switch the rod elements 20, 22, have other-inputs to the television 12, or control the gain at the input to the television 12. Accordingly, such control may be effected by the arrangement shown in FIG. 5. Thus, the rods 20, 22 are connected to the ganged switch banks 78, 80 so that when the switches 78, 80 are in the first position, both of the rods 20, 22 are connected in circuit; when the switches 78, 80 are in the second position only the rod 20 is connected in circuit; when the switches 78, 80 are in the third position only the rod 22 is connected in circuit; when the switches 78, 80 are in the fourth position both the rods 20, 22 are connected in circuit but reversed with respect to the first switch position; and when the switches 78, 80 are in the fifth position neither of the rods 20, 22 is connected in circuit. The switch banks 78, 80 are under the control of the controller 32 which can retrieve from the memory 34 the desired switching configuration.

Sometimes there are signal sources other than the antenna which are desired to be connected to the television 12. For example, a VCR or video camera, or satellite dish are common alternative signal sources. Thus, the controller 32 is coupled to control the A/B/C switch 82, whose A input is the antenna; whose B input is the Source B 84; and whose C input is the Source C 86. The controller 32 retrieves from the memory 34, in response to an appropriate control signal from the remote control unit 14 or the keypad 17, the desired state of the A/B/C switch 82, and then controls the state of the switch 82 in a manner well known to those of skill in the art.

It is also sometimes desirable to control the gain of the video input to the television 12. Accordingly, in such instance there is provided a variable gain circuit (amplifier) 88 which is controlled by the controller 32 in accordance with a desired amplifier strength retrieved from the memory 34. The variable gain circuit 88 could also include inductors and capacitors and other elements which can be selectively connected in circuit with the antenna to improve the television signal reception. The switched and conditioned input signals are coupled to the output circuit 92 and from there to the television 12.

Although mechanical switches 78, 80, 82 have been illustrated, it is understood that electronic switches or electro-mechanical switches (e.g., relays) without motors can be utilized as well.

In order to store desired configurations in the memory 34, the remote control unit 14 has operator accessible switch actuators 16 which each correspond to a specific function. The keypad 17 has similar actuators. Thus, the viewer can actuate a switch which causes the remote control unit 14 or the keypad 17 to transmit control signals for varying the rod 20 angle $\phi$1. The other parameters of the antenna system 10 can then be varied until the viewer determines that the best configuration for the channel being viewed has been attained. Alternatively, the viewer can manually adjust the antenna elements and the other configuration parameters, such as the gain. The viewer then actuates appropriate ones of the switches 16 identifying the channel being viewed and instructing the controller 32 to store the selected set of configuration parameters. The controller 32 then interrogates the various sensors of the electro-mechanical and electronic assemblies and stores their readings in appropriate locations of the memory 34 associated with the channel being viewed. It is of course understood that the viewer can at any time adjust individual ones of the configuration parameters via the remote control unit 14 or the keypad 17 without designating a memory location. It is further understood that all or some of the receiving elements of the antenna system 10 can be manually positioned or configured and that such resulting configuration can be stored in the memory 34, using the remote control unit 14 or the keypad 17.

In addition to the foregoing, the antenna system 10 may include an internal clock means 35 allowing, for a given channel, different sets of configuration parameters for different times of day. It is also contemplated that the antenna system 10 can be programmed to configure itself to a designated channel configuration at a preset time, for example, so that a VCR coupled to the antenna system 10 can be likewise programmed to record a desired television program and the antenna system 10 will be configured for optimal reception for that program. Further, the same remote control unit which controls the television may be utilized to control the antenna system. Alternatively, a remote control unit can be used which appends codes, which can only be recognized by the antenna system, to the channel selection signal. These codes will cause the antenna to be configured optimally for the selected channel. Still further, an arrangement can be implemented to assure synchronization between the antenna system and the television whereby the antenna system receives the channel selection signal, configures the receiving elements, and then transmits the channel selection signal to the television. Also, other types of receiving elements, in addition to rods and loops, may be controlled in a similar manner as described above.

Accordingly, there has been disclosed an improved system for controlling the configuration of an antenna from a remote location. While illustrative embodiments of the present invention have been disclosed herein, it is understood that various modifications and adaptations to the disclosed embodiments will be apparent to those of ordinary skill in the art and it is intended that this invention be limited only by the scope of the appended claims.

What is claimed is:

1. A system for configuring an antenna having at least two receiving elements mounted to a base, said at least two receiving elements being movable relative to said base, the system comprising:

controllable electro-mechanical means coupled between said base and said at least two receiving elements for selectively moving each of said at least two receiving elements independently of each other relative to said base;

control unit means responsive to operator manipulation thereof for selectively transmitting a control signal;

receiver means for receiving said control signal; and control means coupled to said receiver means and to said electro-mechanical means for responding to a received control signal and controlling said electro-mechanical means in accordance with said received control signal to selectively and independently move each of said at least two receiving elements so as to effect a desired configuration of said antenna;

wherein said antenna is associated with a receiver tunable to a selected one of a plurality of frequencies;

wherein said control means includes addressable memory means for storing a plurality of sets of configuration parameters for said at least two receiving elements, each of said sets of configuration parameters being stored in a respective addressable location of said memory means, and each memory means address corresponds to a respective frequency;

wherein said control unit means is effective for transmitting a control signal which corresponds to a designated frequency; and wherein said control means is responsive to a received control signal corresponding to said designated frequency for retrieving from said memory means the set of configuration parameters stored at the memory means address corresponding to said designated frequency and controlling said electro-mechanical means to move at least one of said at least two receiving elements so as to configure said antenna in accordance with said retrieved set of configuration parameters.

2. The system according to claim 1 wherein:

said electro-mechanical means includes first controllable motor means coupled to selectively and independently rotate said at least two receiving elements about a first axis; and said control means responds to said received control signal to cause said first motor means to rotate said at least two receiving elements to a desired angular orientation about said first axis.

3. The system according to claim 2 wherein:

said electro-mechanical means includes second controllable motor means coupled to selectively and independently rotate at least one of said at least two receiving elements about a second axis; and said control means responds to said received control signal to cause said second motor means to rotate at least one of said at least two receiving elements to a desired angular orientation about said second axis.

4. The system according to claim 1 wherein:

at least one of said at least two receiving elements is a receiving rod having a plurality of telescoping rod sections;

said electro-mechanical means includes third controllable motor means coupled to said at least one of said telescoping rod sections; and said control means responds to said received control signal to cause said third motor means to move said at least one telescoping rod section in a telescoping relation to said another of said plurality of rod sections to achieve a desired overall length for said at least one receiving rod.

5. The system according to claim 1 wherein:

one of said at least two receiving elements is a receiving loop of generally circular shape, said loop including a section of controllably variable effective length;

said electro-mechanical means includes a controllable motor means coupled to said loop section for varying the length of said loop; and said control means responds to said received control signal to cause said motor means to vary the length of said loop section so as to achieve a desired effective diameter for said receiving loop.

6. The system according to claim 1 wherein said control means includes:

means for deriving from said received control signal a desired position signal representative of a desired position for at least one of said at least two receiving elements;

position sensing means coupled to at least one of said at least two receiving elements for providing an actual position signal representative of the instantaneous position of at least one of said at least two receiving elements relative to said base; and means for comparing said actual position signal with said desired position signal and activating the electro-mechanical means to reposition the at least one of the at least two receiving elements to the desired position when a signal comparison does not match.

7. The system according to claim 1 wherein said antenna includes a pair of receiving elements, said system further includes an output circuit and switching means coupled between said pair of elements and said output circuit for selectively connecting said pair of elements to said output circuit, and wherein:

said control means responds to said received control signal for controlling said switching means to set up a desired connection through said switching means.

8. The system according to claim 1 further including:

an output circuit; and controllable gain means coupled between at least one of said at least two receiving elements and said output circuit;

wherein said control means responds to said received control signal for controlling said gain means to achieve a desired gain characteristic for said antenna.

9. The system according to claim 1 further including:

an output circuit;

at least one signal source in addition to said antenna; and switching means coupled to said antenna, said at least one signal source, and said output circuit for selectively connecting one of said antenna and said at least one signal source to said output circuit;

wherein said control means responds to said received control signal for controlling said switching means to set up a desired connection to said output circuit through said switching means.

10. The system according to claim 1 wherein said electro-mechanical means is coupled to at least one of said at least two receiving elements by clutch means;

whereby at least one of said at least two receiving elements can be decoupled from said electro-mechanical means for movement independent of said electro-mechanical means.

11. The system according to claim 1 wherein said control means responds to said received control signal by using a stochastic process to control said electro-mechanical means by choosing configuration parameters for at least one of the at least two receiving elements in a random manner.

12. A system for configuring an antenna having at least two receiving elements mounted to a base, said at least two receiving elements being movable relative to said base, the system comprising:

controllable electro-mechanical means coupled between said base and said at least two receiving elements for selectively and independently moving each of said at least two receiving elements relative to said base;

control unit means responsive to operator manipulation thereof for selectively transmitting a control signal corresponding to desired movements of said at least two receiving elements;

receiver means for receiving said control signal; and control means coupled to said receiver means and to said electro-mechanical means for responding to a received control signal and controlling said electro-mechanical means in accordance with said received control signal to selectively move at least one of said at least two receiving elements so as to effect a desired configuration of said antenna.

13. The system according to claim 12 wherein:

said electro-mechanical means includes first controllable motor means coupled to selectively and independently rotate said at least two receiving elements about a first axis; and said control means responds to said received control signal to cause said first motor means to rotate said at least two receiving elements to a desired angular orientation about said first axis.

14. The system according to claim 13 wherein:

said electro-mechanical means includes second controllable motor means coupled to selectively and independently rotate at least one of said at least two receiving elements about a second axis; and said control means responds to said received control signal to cause said second motor means to rotate said at least one of said at least two receiving elements to a desired angular orientation about said second axis.

15. The system according to claim 12 wherein:

at least one of said at least two receiving elements is a receiving rod having a plurality of telescoping rod sections;

said electro-mechanical means includes third controllable motor means coupled to said at least one of said telescoping rod sections; and said control means responds to said received control signal to cause said third motor means to move said at least one telescoping rod section in a telescoping relation to said another of said plurality of rod sections to achieve a desired overall length for said at least one receiving rod.

16. The system according to claim 12 wherein:

one of said at least two receiving elements is a receiving loop of generally circular shape, said loop including a section of controllably variable effective length;

said electro-mechanical means includes a controllable motor means coupled to said loop section for varying the length of said loop; and said control means responds to said received control signal to cause said motor means to vary the length of said loop section so as to achieve a desired effective diameter for said receiving loop.

17. The system according to claim 12 wherein said antenna includes a pair of receiving elements, said system further includes an output circuit and switching means coupled between said pair of elements and said output circuit for selectively connecting said pair of elements to said output circuit, and wherein:

said control means responds to said received control signal for controlling said switching means to set up a desired connection through said switching means.

18. The system according to claim 12 further including:

an output circuit; and controllable gain means coupled between at least one of said at least two receiving elements and said output circuit;

further control means coupled to said receiver means and said gain means for responding to said received control signal and controlling said gain means in accordance with said received control signal.

19. The system according to claim 12 further including:

an output circuit;

at least one signal source in addition to said antenna; and switching means coupled to said antenna, said at least one signal source, and said output circuit for selectively connecting one of said antenna and said at least one signal source to said output circuit;

wherein said control means responds to said received control signal for controlling said switching means to set up a desired connection to said output circuit through said switching means.

20. The system according to claim 12:

wherein said control means includes position sensing means coupled to said at least one of said at least two receiving elements for providing an actual position signal representative of the instantaneous position of said at least one receiving element;

wherein said antenna is associated with a receiver tunable to a selected one of the plurality of receiving frequencies;

wherein said control means includes addressable memory means for storing a plurality of sets of configuration parameters for said at least one of said at least two receiving elements, each of said sets of configuration parameters being stored in a respective addressable location of said memory means, and each memory means address corresponds to a respective frequency;

wherein said control unit means is effective for transmitting a control signal which corresponds to a designated frequency; and wherein said control means is responsive to said received control signal corresponding to said designated frequency for storing in said memory means at the memory means address corresponding to said designated frequency the actual position signal provided by said sensing means for said at least one receiving element.

21. The system according to claim 12 wherein said electro-mechanical means is coupled to at least one of said at least two receiving elements by clutch means;

whereby at least one of said at least two receiving elements can be decoupled from said electro-mechanical means for movement independent of said electro-mechanical means.

22. The system according to claim 12 wherein said control means responds to said received control signal by using a stochastic process to control said electro-mechanical means by choosing configuration parameters for at least one of the at least two receiving elements in a random manner.

23. A system for configuring an antenna having at least two receiving elements mounted to a base, said at least two receiving elements being movable relative to said base, the system comprising:

controllable electro-mechanical means coupled between said base and said at least two receiving elements for selectively moving each of said at least two receiving elements independently of each other relative to said base;

control unit means responsive to operator manipulation thereof for selectively transmitting a control signal;

receiver means for receiving said control signal; and control means coupled to said receiver means and to said electro-mechanical means for responding to a received control signal and controlling said electro-mechanical means in accordance with said received control signal to move at least one of said at least two receiving elements so as to effect a desired configuration of said antenna;

wherein said control means includes addressable memory means for storing a plurality of sets of configuration parameters for said antenna, each of said sets of configuration parameters being stored in a respective addressable location of said memory means;

wherein said control unit means is effective for transmitting a selection control signal which corresponds to a designated memory address; and wherein said control means is responsive to a received selection control signal corresponding to said designated memory address for retrieving from said memory the set of configuration parameters stored at said designated memory address and configuring said antenna in accordance with said retrieved set of configuration parameters.

24. The system according to claim 23 wherein:

said electro-mechanical means includes first controllable motor means coupled to selectively and independently rotate said at least two receiving elements about a first axis; and said control means responds to said received control signal to cause said first motor means to rotate said at least two receiving elements to a desired angular orientation about said first axis.

25. The system according to claim 24 wherein:

said electro-mechanical means includes second controllable motor means coupled to selectively and independently rotate at least one of said at least two receiving elements about a second axis; and said control means responds to said received control signal to cause said second motor means to rotate at least one of said at least two receiving elements to a desired angular orientation about said second axis.

26. The system according to claim 23 wherein:

at least one of said at least two receiving elements is a receiving rod having a plurality of telescoping rod sections;

said electro-mechanical means includes third controllable motor means coupled to said at least one of said telescoping rod sections; and said control means responds to said received control signal to cause said third motor means to move said at least one telescoping rod section in a telescoping relation to said another of said plurality of rod sections to achieve a desired overall length for said at least one receiving rod.

27. The system according to claim 23 wherein:

one of said at least two receiving elements is a receiving loop of generally circular shape, said loop including a section of controllably variable effective length;

said electro-mechanical means includes a controllable motor means coupled to said loop section for varying the length of said loop; and said control means responds to said received control signal to cause said motor means to vary the length of said loop section so as to achieve a desired effective diameter for said receiving loop.

28. The system according to claim 23 wherein said control means includes:

means for deriving from said received control signal a desired position signal representative of a desired position for each of said at least two receiving elements;

position sensing means coupled to at least one of said at least two receiving elements for providing an actual position signal representative of the instantaneous position of at least one of said at least two receiving elements relative to said base; and means for comparing said actual position signal with said desired position signal and activating the electro-mechanical means to reposition the at least one of the at least two receiving elements to the desired position when a signal comparison does not match.

29. The system according to claim 23 wherein said antenna includes a pair of receiving elements, said system further includes an output circuit and switching means coupled between said pair of elements and said output circuit for selectively connecting said pair of elements to said output circuit, and wherein:

said control means responds to said received control signal for controlling said switching means to set up a desired connection through said switching means.

30. The system according to claim 23 further including:

an output circuit; and controllable gain means coupled between at least one of said at least two receiving elements and said output circuit;

wherein said control means responds to said received control signal for controlling said gain means to achieve a desired gain characteristic for said antenna.

31. The system according to claim 23 further including:

an output circuit;

at least one signal source in addition to said antenna; and switching means coupled to said antenna, said at least one signal source, and said output circuit for selectively connecting one of said antenna and said at least one signal source to said output circuit;

wherein said control means responds to said received control signal for controlling said switching means to set up a desired connection to said output circuit through said switching means.

32. The system according to claim 23 wherein said electro-mechanical means is coupled to at least one of said at least two receiving elements by clutch means;

whereby at least one of said at least two receiving elements can be decoupled from said electro-mechanical means for movement independent of said electro-mechanical means.

33. The system according to claim 23 wherein said control means responds to said received control signal by using a stochastic process to control said electro-mechanical means by choosing the configuration parameters for at least one of the at least two receiving elements in a random manner.

34. A system for configuring an antenna having at least two receiving elements mounted to a base, said at least two receiving elements being movable relative to said base, the system comprising:

motor means mounted to the said base;

clutch means for coupling said motor means to each of said at least two receiving elements;

means for providing a control signal representative of a desired position of each of said at least two receiving elements relative to said base;

position sensing means coupled to each of said at least two receiving elements for providing an actual position of each of said at least two receiving elements relative to said base;

means for comparing said actual position signal with said control signal and providing a comparison signal indicative of the difference therebetween; and means for receiving said comparison signal and controlling said motor means to selectively and independently move each of said at least two receiving elements so as to minimize said comparison signal.

35. An antenna system comprising:

at least two receiving elements providing a first source of signals to the antenna system, the receiving elements being capable of being selectively and independently positioned in relation to an associated fixed arbitrary reference point;

a control unit for transmitting a selected first control signal;

a memory capable of having sets of configuration parameters for the antenna system written into and stored therein and read out therefrom, each set of configuration parameters comprising information for at least the position of two of the at least two receiving elements;

a controller responsive to the first control signal for interpreting the first control signal and generating a second control signal to the memory for writing into the memory a set of configuration parameters at an address indicated by the first control signal, or for reading from the memory a set of configuration parameters stored at an address indicated by the first control signal and generating a third control signal representative of the set of configuration parameters read from the memory; and control means being responsive to the third control signal for adjusting the configuration of the antenna system to match the configuration parameters in the third control signal.

36. The antenna system of claim 35 wherein the control means comprises a positioning means for selectively and independently moving at least one of the at least two receiving elements to a specified angle relative to a first axis, where the specified angle relative to the first axis is one of the antenna configuration parameters indicated in the third control signal.

37. The antenna system of claim 36 wherein the positioning means of the control means is further capable of selectively and independently moving the at least one of the at least two receiving elements to a specified angle relative to a second axis, where the specified angle relative to the second axis is one of the antenna configuration parameters indicated in the third control signal.

38. The antenna system of claim 35 wherein:

at least one of the at least two receiving elements is a telescoping rod with at least one telescoping rod section; and the control means comprises a positioning means responsive to the third control signal from the controller for moving the at least one telescoping rod section relative to at least one other section of the telescoping rod to achieve a specified overall length of the telescoping rod, where the specified overall length of the telescoping rod is one of the antenna configuration parameters indicated in the third control signal.

39. The antenna system of claim 35 further comprising:

an output circuit for generating an output signal to a signal receiving device; and receiving element selector means responsive to the third control signal from the controller for establishing a specified connection between the at least two receiving elements and the output circuit, where the specified connection between the at least two receiving elements and the output circuit is one of the antenna configuration parameters indicated in the third control signal.

40. The antenna system of claim 35 further comprising:

an output circuit for generating an output signal to a signal receiving device; and an amplifier of variable gain coupled between at least one of the at least two receiving elements and the output circuit, the amplifier being responsive to the third control signal from the controller for adjusting the signal from the at least one of the at least two receiving elements to a specified gain level, where the specified gait level is one of the antenna configuration parameters indicated in the third control signal.

41. The antenna system of claim 35 further comprising:

a second source of signals;

an output circuit for generating an output signal to a signal receiving device; and signal source selector means responsive to the third control signal from the controller for establishing a specified connection between the output circuit and one of the signal sources selected from a group consisting of the first source of signals and the second source of signals, where the specified connection between the output circuit and the one of the selected signal sources is one of the antenna configuration parameters indicated in the third control signal.

42. The antenna system of claim 35 further comprising:

sensing means for generating a fourth signal representative of the state of at least one of the antenna configuration parameters; and the controller is responsive to the first control signal for storing the antenna configuration parameters contained in the fourth signal at an address in the memory indicated in the first control signal.

43. The antenna system of claim 35 wherein:

one of the at least two receiving elements comprises a receiving loop of generally circular shape comprising a section of controllably variable length; and the control means comprises loop adjusting means coupled to the receiving loop and being responsive to the third control signal from the controller for varying the effective diameter of the receiving loop, where the effective diameter of the receiving loop is one of the antenna configuration parameters indicated in the third control signal.

44. The antenna system of claim 35 wherein the antenna system further comprises decoupling means for selectively decoupling at least one of the configuration parameters from the control means to allow for manual adjustment of the at least one decoupled configuration parameter.

45. The antenna system of claim 35 wherein the controller responds to the received first control signal for using a stochastic process to generate a random value for at least one of the configuration parameters of the antenna system, and for generating a fourth control signal representative of the random value, the control means being responsive to the fourth control signal for adjusting the at least one configuration parameter to match the random value.

46. The antenna system of claim 35 wherein each of the first and associated second control signals, the memory address identified by the second control signal, and the configuration parameters stored in the memory address identified by the second control signal, correspond to a selected tuning frequency for a signal receiver capable of receiving a plurality of frequencies.

47. The antenna system of claim 35 further comprising:

a signal receiver control means responsive to the third control signal from the controller for causing a signal receiver capable of receiving a plurality of frequencies to tune to a specified tuning frequency, where the specified frequency is one of the antenna configuration parameters indicated in the third control signal.

48. The antenna system of claim 35 wherein the control unit is further capable of transmitting a fourth control signal for causing a receiver capable of being tuned to a plurality of frequencies to be tuned to a frequency indicated by the fourth control signal.

49. The antenna system of claim 35 wherein the control unit comprises a clock means capable of causing the control unit to generate the first control signal at a specified time.

50. The antenna system of claim 35 wherein:

the controller comprises a clock means, and a memory address generated by the controller in the second control signal is dependent on both a time and information received in the first control signal.

51. An antenna system comprising:

at least one receiving element providing a source of signals to the antenna system, at least one of the at least one receiving element being capable of being selectively and independently positioned in relation to an associated fixed arbitrary reference point;

a control unit for transmitting a selected first control signal;

read/write memory having sets of configuration parameters for the antenna system written into and stored therein and read out therefrom, each set of configuration parameters comprising information relating to the position of the at least one receiving element and at least one configuration parameter not related to the positioning of the at least one receiving element;

a controller responsive to the first control signal for interpreting the first control signal and for generating a second control signal to the memory for writing into the memory a set of configuration parameters at an address indicated by the first control signal, or for reading from the memory a set of configuration parameters stored at an address indicated by the first control signal and generating a third control signal representative of the set of configuration parameters read from the memory;

control means responsive to the third control signal for adjusting the configuration of the antenna system to match the configuration parameters in the third control signal;

an output circuit for generating an output signal to a signal receiving device; and an amplifier of variable gain coupled between at least one of the at least one receiving element and the output circuit, the amplifier being responsive to the third control signal from the controller for adjusting the signal from the at least one of the at least one receiving element to a specified gain level, where the specified gain level is one of the antenna configuration parameters indicated in the third control signal.

52. An antenna system comprising:

at least one receiving element providing a source of signals to the antenna system, at least one of the at least one receiving element being capable of being selectively and independently positioned in relation to an associated fixed arbitrary reference point;

a control unit for transmitting a selected first control signal;

a read/write memory having sets of configuration parameters for the antenna system written into and stored therein and read out therefrom, each set of configuration parameters comprising information relating to the position of the at least one receiving element and at least one configuration parameter not related to the positioning of the at least one receiving element;

a controller responsive to the first control signal for interpreting the first control signal and for generating a second control signal to the memory for writing into the memory a set of configuration parameters at an address indicated by the first control signal, or for reading from the memory a set of configuration parameters stored at an address indicated by the first control signal and generating a third control signal representative of the set of configuration parameters read from the memory; and control means responsive to the third control signal for adjusting the configuration of the antenna system to match the configuration parameters in the third control signal; and wherein:

at least one of the at least one receiving element is a telescoping rod with at least one telescoping rod section; and the control means comprises a positioning means responsive to the third control signal from the controller for moving the at least one telescoping rod section relative to at least one other section of the telescoping rod to achieve a specified overall length of the telescoping rod, where the specified overall length of the telescoping rod is one of the antenna configuration parameters indicated in the third control signal.

53. An antenna system comprising:

at least one receiving element providing a source of signals to the antenna system, at least one of the at least one receiving element being capable of being selectively and independently positioned in relation to an associated fixed arbitrary reference point;

a control unit for transmitting a selected first control signal;

a read/write memory having sets of configuration parameters for the antenna system written into and stored therein and read out therefrom, each set of configuration parameters comprising information relating to the position of the at least one receiving element and at least one configuration parameter not related to the positioning of the at least one receiving element;

a controller responsive to the first control signal for interpreting the first control signal and for generating a second control signal to the memory for writing into the memory a set of configuration parameters at an address indicated by the first control signal, or for reading from the memory a set of configuration parameters stored at an address indicated by the first control signal and generating a third control signal representative of the set of configuration parameters read from the memory; and control means responsive to the third control signal for adjusting the configuration of the antenna system to match the configuration parameters in the third control signal; and wherein:

one of the at least one receiving element comprises a receiving loop of generally circular shape comprising a section of controllably variable length; and the control means comprises loop adjusting means coupled to the receiving loop and being responsive to the third control signal from the controller for varying the effective diameter of the receiving loop, where the effective diameter of the receiving loop is one of the antenna configuration parameters indicated in the third control signal.

54. An antenna system comprising:

at least one receiving element providing a source of signals to the antenna system, at least one of the at least one receiving element being capable of being selectively and independently positioned in relation to an associated fixed arbitrary reference point;

a control unit for transmitting a selected first control signal;

a read/write memory having sets of configuration parameters for the antenna system written into and stored therein and read out therefrom, each set of configuration parameters comprising information relating to the position of the at least one receiving element and at least one configuration parameter not related to the positioning of the at least one receiving element;

a controller responsive to the first control signal for interpreting the first control signal and for regenerating a second control signal to the memory for writing into the memory a set of configuration parameters at an address indicated by the first control signal, or for reading from the memory a set of configuration parameters stored at an address indicated by the first control signal and generating a third control signal representative of the set of configuration parameters read from the memory; and control means responsive to the third control signal for adjusting the configuration of the antenna system to match the configuration parameters in the third control signal; and wherein the controller responds to the received first control signal for using a stochastic process to generate a random value for at least one of the configuration parameters of the antenna system, and for generating a fourth control signal representative of the random value, the control means being responsive to the fourth control signal for adjusting the at least one configuration parameter to match the random value.

55. An antenna system comprising:

a signal source comprising at least one receiving element being independently and selectively movable in relation to a fixed arbitrary reference point;

a control unit for transmitting a selected first control signal;

a read/write memory having sets of configuration parameters for the antenna system written into and stored therein and read out therefrom, each set of configuration parameters comprising information not related to a position of the at least one receiving element;

a controller responsive to the first control signal for interpreting the first control signal and for generating a second control signal to the memory for writing into the memory a set of configuration parameters at an address indicated by the first control signal, or for reading from the memory a set of configuration parameters stored at an address indicated by the first control signal and generating a third control signal representative of the set of configuration parameters read from the memory;

control means responsive to the third control signal for adjusting the configuration of the antenna system to match the configuration parameters in the third control signal;

an output circuit for generating an output signal to a signal receiving device; and an amplifier of variable gain coupled between at least one of the at least one receiving element and the output circuit, the amplifier being responsive to the third control signal from the controller for adjusting the signal from the at least one of the at least one receiving element to a specified gain level, where the specified gain level is one of the antenna configuration parameters indicated in the third control signal.

56. An antenna system comprising;

a signal source comprising at least one receiving element being independently and selectively movable in relation to a fixed arbitrary reference point;

a control unit for transmitting a selected first control signal;

a read/write memory having sets of configuration parameters for the antenna system written into and stored therein and read out therefrom, each set of configuration parameters comprising information not related to a position of the at least one receiving element;

a controller responsive to the first control signal for interpreting the first control signal and for generating a second control signal to the memory for writing into the memory a set of configuration parameters at an address indicated by the first control signal, or for reading from the memory a set of configuration parameters stored at an address indicated by the first control signal and generating a third control signal representative of the set of configuration parameters read from the memory; and control means responsive to the third control signal for adjusting the configuration of the antenna system to match the configuration parameters in the third control signal; and wherein the controller responds to the received first control signal for using a stochastic process to generate a random value for at least one of the configuration parameters of the antenna system, and for generating a fourth control signal representative of the random value, the control means being responsive to the fourth control signal for adjusting the at least one configuration parameter to match the random value.

57. An antenna system comprising:

a signal source comprising at least one receiving element being independently and selectively movable in relation to a fixed arbitrary reference point;

a control unit for transmitting a selected first control signal;

a read/write memory having sets of configuration parameters for the antenna system written into and stored therein and read out therefrom, each set of configuration parameters comprising information not related to a position of the at least one receiving element;

a controller responsive to the first control signal for interpreting the first control signal and for generating a second control signal to the memory for writing into the memory a set of configuration parameters at an address indicated by the first control signal, or for reading from the memory a set of configuration parameters stored at an address indicated by the first control signal and generating a third control signal representative of the set of configuration parameters read from the memory; and control means responsive to the third control signal for adjusting the configuration of the antenna system to match the configuration parameters-in the third control signal; and wherein:

the signal source comprises at least two receiving elements capable of being independently and selectively positioned in relation to a fixed arbitrary reference point; and each set of configuration parameters in the memory further comprises position information indicating a predetermined position of at least one of the at least two receiving elements.

58. An antenna system comprising:

a signal source comprising at least one receiving element being independently and selectively movable in relation to a fixed arbitrary reference point;

a control unit for transmitting a selected first control signal;

a read/write memory having sets of configuration parameters for the antenna system written into and stored therein and read out therefrom, each set of configuration parameters comprising information not related to a position of the at least one receiving element;

a controller responsive to the first control signal for interpreting the first control signal and for generating a second control signal to the memory for writing into the memory a set of configuration parameters at an address indicated by the first control signal, or for reading from the memory a set of configuration parameters stored at an address indicated by the first control signal and generating a third control signal representative of the set of configuration parameters read from the memory; and control means responsive to the third control signal for adjusting the configuration of the antenna system to match the configuration parameters in the third control signal; and wherein:

one of the at least one receiving element comprises a receiving loop of generally circular shape comprising a section of controllably variable length; and the control means comprises loop adjusting means coupled to the receiving loop and being responsive to the third control signal from the controller for varying the effective diameter of the receiving loop, where the effective diameter of the receiving loop is one of the antenna configuration parameters indicated in the third control signal.

59. An antenna system comprising:

a signal source comprising at least one receiving element being independently and selectively movable in relation to a fixed arbitrary reference point;

a control unit for transmitting a selected first control signal;

a read/write memory having sets of configuration parameters for the antenna system written into and stored therein and read out therefrom, each set of configuration parameters comprising information not related to a position of the at least one receiving element;

a controller responsive to the first control signal for interpreting the first control signal and for generating a second control signal to the memory for writing into the memory a set of configuration parameters at an address indicated by the first control signal, or for reading from the memory a set of configuration parameters stored at an address indicated by the first control signal and generating a third control signal representative of the set of configuration parameters read from the memory; and control means responsive to the third control signal for adjusting the configuration of the antenna system to match the configuration parameters in the third control signal; and wherein:

at least one of the at least one receiving element is a telescoping rod with at least one telescoping rod section; and the control means comprises a positioning means responsive to the third control signal from the controller for moving the at least one telescoping rod section relative to at least one other section of the telescoping rod to achieve a specified overall length of the telescoping rod, where the specified overall length of the telescoping rod is one of the antenna configuration parameters indicated in the third control signal.

60. An antenna system comprising:

a receiving loop of generally circular shape comprising a section of controllably variable length;

a control unit for transmitting a selected first control signal;

a memory capable of having sets of configuration parameters for the antenna system written into and stored therein and read out therefrom;

a controller responsive to the first control signal for interpreting the first control signal and for generating a second control signal to the memory for writing into the memory a set of configuration parameters at an address indicated by the first control signal, or for reading from the memory a set of configuration parameters stored at an address indicated by the first control signal and generating a third control signal representative of the set of configuration parameters read from the memory; and control means comprising loop adjusting means coupled to the receiving loop and being responsive to the third control signal from the controller for varying the effective diameter of the receiving loop, where the effective diameter of the receiving loop is one of the antenna configuration parameters indicated in the third control signal.

* * * * *